(12) United States Patent
Money

(10) Patent No.: US 11,680,866 B2
(45) Date of Patent: Jun. 20, 2023

(54) BLEEDING AIR REGULATOR CONTROL PNEUMATIC CIRCUIT, AND LEAKAGE DETECTION SYSTEM FOR TESTING A DEVICE UNDER TEST

(71) Applicant: Leakmaster, Incorporated, Evansville, IN (US)

(72) Inventor: Barry Money, Evansville, IN (US)

(73) Assignee: Leakmaster, Inc., Evansville, IN (US)

( * ) Notice: Subject to any disclaimer, the term of this patent is extended or adjusted under 35 U.S.C. 154(b) by 0 days.

(21) Appl. No.: 17/525,342

(22) Filed: Nov. 12, 2021

(65) Prior Publication Data

US 2022/0074806 A1 Mar. 10, 2022

Related U.S. Application Data

(62) Division of application No. 16/776,156, filed on Jan. 29, 2020, now Pat. No. 11,181,436.

(60) Provisional application No. 62/817,085, filed on Mar. 12, 2019.

(51) Int. Cl.
*G01M 3/32* (2006.01)

(52) U.S. Cl.
CPC ................. *G01M 3/3209* (2013.01)

(58) Field of Classification Search
CPC ........ G01M 3/3209; G01M 3/00; G01M 3/16; G01M 3/26; G01M 3/2815; G01M 3/3272; G01M 3/329; G01M 3/34; G01M 3/2876; G01M 3/002; G01M 3/32
See application file for complete search history.

(56) References Cited

U.S. PATENT DOCUMENTS

| 4,331,179 | A | * | 5/1982 | Gray | G05D 16/166 251/63.4 |
|---|---|---|---|---|---|
| 5,065,350 | A | | 11/1991 | Fedder | |
| 5,412,978 | A | | 5/1995 | Boone | |
| 2015/0285383 | A1 | * | 10/2015 | Stumbo | F16K 5/0605 137/1 |
| 2018/0180069 | A1 | * | 6/2018 | Wagner-Stuerz | F15B 21/08 |

* cited by examiner

Primary Examiner — Harshad R Patel
Assistant Examiner — Truong D Phan
(74) Attorney, Agent, or Firm — Martin IP Law Group; C. Richard Martin

(57) ABSTRACT

The present invention is a bleeding air regulator control pneumatic circuit for supplying air to a leakage detection system for testing a device under test for leakage. The bleeding air regulator control pneumatic circuit includes an air supply source having an outlet port for supplying compressed air to the leakage detection system; an air relay having a first port in fluid communication with the outlet port of the air supply source and a second port in fluid communication with an inlet of the leakage detection system; a pressure regulator having an inlet port in fluid communication with and connected at a point between the outlet port of the air supply source and the first port of the air relay, and an outlet port in fluid communication with and connected to a third port of the air relay; a bleed valve having a first port in fluid communication with a fourth port of the air relay and a second bleed port; and a flow control valve positioned between and in fluid communication with the air relay and the bleed valve.

7 Claims, 4 Drawing Sheets

BLEEDING AIR REGULATOR CONTROL PNEUMATIC CIRCUIT, AND LEAKAGE DETECTION SYSTEM FOR TESTING A DEVICE UNDER TEST

FIELD OF THE INVENTION

The present invention relates to systems and methods for pneumatic testing of fluid or gas carrying components. More specifically, the present invention relates to a system and method for testing such components for leaks involving the use of a bleeding air regulator control pneumatic circuit.

DESCRIPTION OF THE RELATED ART

Pneumatic pressure regulators are designed to provide a constant pressure output from a fluctuating supply pressure. Pressure regulators provide varying degrees of accuracy with regard to their reduced pressure output. General Purpose pressure regulators work for most fluid power applications. However, for more pressure-critical applications precision regulators can provide the user with better control.

High Precision Air Regulators are traditionally used in leak testing instrumentation to control the setpoint air pressure delivered to DUT (Device Under Test). These precision air regulators typically have a constant air bleed to atmosphere to help maintain a stable pressure output from a fluctuating supply pressure. The higher the setpoint pressure on the regulator, the higher the bleed flow rate. This bleed rate is not controllable by the user and it is fixed, dependent upon the pressure setpoint.

When Mass Flow Leak Testing, the pressure regulator is especially important because it is constantly connected to the DUT. If the pressure is variable (floating up or down) the flow sensor measurement will be variable as well. If the pressure from the air regulator is rising, the flow sensor will measure a positive flow reading. If the pressure from the air regulator is falling, the flow sensor will measure a negative flow reading. So, it is very critical that the test air pressure be held as steady with as little variance as possible to ensure repeatable flow sensor readings. In turn, the more accurately the pressure can be maintained the DUT, the more accurately the flow sensor readings will be which is critical for leak testing instrumentation.

One example of a prior art mass flow leak testing system 10 is shown in FIG. 1. Pressurized air is introduced into the system 10 through air supply 20. The pressurized air then passes through an air relay 25. A pressure regulator 30 is used to provide a constant pressure signal to the air relay which sets the output pressure to the DUT 100.

In testing for leaks, the DUT 100 goes through four distinct steps: fill, stabilize, test and vent. In the fill step, the fill valve 35 is opened and air from the air supply 20 fills the DUT 100 to a final setpoint pressure. In the stabilize step, the fill valve 35 remains open for a programmed period of time to ensure that the setpoint is stable. Once the programmed period of time for stabilization is complete, the fill valve 35 is closed and the test valve 40 is open thereby directing all air through the mass flow sensor 45 for a programmed period of time. The air flowing through the mass flow sensor 45 measures the amount of air flow required to maintain the setpoint pressure.

The airflow measurement in turn determines the amount of leakage of the DUT 100. Lastly, in the vent step, the fill valve 35 and test valve 40 are closed/de-energized and the vent valve 50 is opened/energized allowing air from the DUT 100 to escape through vent 55. FIG. 2 illustrates the pressurization profile when the prior art system shown in FIG. 1 is used. Of note with regard to the present invention is the flattening of the curve as the pressure approaches the final setpoint pressure $P_{fs}$ during the fill stage. This increases the amount of time needed to complete the fill stage.

One major problem with the precision air regulator (bleeding type) is that there are limitations on size and output flow which can limit the leak test instruments ability to quickly fill a DUT. Therefore, a leak test instrument manufacturer is limited by what can be purchased for this type of device. Because of size and flow limitations, this device can become a limiting factor on leak test cycle time.

Accordingly, there is a need for a bleeding air regulator control pneumatic circuit that can be used to quickly fill larger DUTs thus reducing the overall cycle time for testing.

SUMMARY OF THE INVENTION

It is therefore an object of the present invention to provide a bleeding air regulator control pneumatic circuit that can be used to quickly fill larger DUTs thus reducing the overall cycle time for testing. The present invention meets these objects by providing an improved bleeding air regulator control pneumatic circuit that is part of a larger leakage detection system for testing a device under test for leakage and method for testing devices for leaks.

According to one presently preferred embodiment of the invention, there is provided a bleeding air regulator control pneumatic circuit for supplying air to a leakage detection system for testing a device under test for leakage. The bleeding air regulator control pneumatic circuit comprises an air supply source having an outlet port for supplying compressed air to the leakage detection system; an air relay having a first port in fluid communication with the outlet port of the air supply source and a second port in fluid communication with an inlet of the leakage detection system; a pressure regulator having an inlet port in fluid communication with and connected at a point between the outlet port of the air supply source and the first port of the air relay, and an outlet port in fluid communication with and connected to a third port of the air relay; a bleed valve having a first port in fluid communication with a fourth port of the air relay and a second bleed port; and means for controlling the fluid flow from the second bleed port of the bleed valve.

According to another aspect of the invention, the means for controlling the fluid flow comprises a flow control valve positioned between and in fluid communication with the air relay and the bleed valve. The air relay may preferably be a non-bleeding air relay. The leakage detection system may include a fill valve having a first port in fluid communication with inlet of the leakage detection system and a second port in fluid communication with the device under test; a test valve having a first port in fluid communication with the inlet of the leakage detection system and a second port in fluid communication with the device under test; a mass flow sensor in fluid communication with and positioned between the test valve and the inlet of the leakage detection system; a vent valve having a first port in fluid communication with the device under test and a second port open to a vent to the surrounding atmosphere; and a pressure transducer in fluid communication with the second port of the fill valve and the device under test.

According to another aspect of the invention, there is provided a leakage detection system for testing a device under test for leakage. The leakage detection system comprises an air supply source having an outlet port for supplying compressed air; an air relay having a first port in fluid communication with the outlet port of said air supply, a second port, a third port and a fourth port; a pressure regulator having an inlet port in fluid communication with and connected at a point between the outlet port of the air supply source and the first port of the air relay and an outlet port in fluid communication with and connected to the third port of the air relay; a bleed control valve having a first port in fluid communication with a fourth port of the air relay and a second bleed port; means for controlling the fluid flow from the second bleed port of the bleed valve; a fill valve having a first port in fluid communication with the second port of the air relay, and a second port in fluid communication with the device under test; a test valve having a first port in fluid communication with the second port of the air relay, and a second port in fluid communication with the device under test; a mass flow sensor in fluid communication with and positioned between the test valve and the second port of the air relay; a vent valve having a first port in fluid communication with the device under test and a second port open to a vent to the surrounding atmosphere; and a pressure transducer in fluid communication with the second port of the fill valve and the device under test.

The means for controlling may comprise a flow control valve positioned between and in fluid communication with the air relay and the bleed valve. The air relay may be a non-bleeding air relay.

Also provided according to another aspect of the invention is a method of testing for leaks in a device under test by measuring the rate of leakage of a gas from the device under test. First, the device under test is filled by opening a fill valve having a first port in fluid communication with a second port of an air relay, and a second port in fluid communication with the device under test; opening a bleed valve having a first port in fluid communication with a fourth port of the air relay; and filling the device under test slightly above a final setpoint pressure for a programmed period of time with air from an air supply source having an outlet port for supplying compressed air to the device through the air relay and fill valve. Second, the device under test is stabilized by closing the bleed valve and slightly lowering the air pressure delivered to the device under test through the air relay; and opening a test valve having a first port in fluid communication with the second port of the air relay, and a second port in fluid communication with the device under test which allows an alternative flow path through a mass flow sensor in fluid communication with and positioned between the test valve and the second port of the air relay. Third, the device under test is tested by closing the fill valve while the test valve remains open such that all test air is being delivered through the test valve and the mass flow sensor for a programmed period of time; measuring the air flow through the mass flow sensor to maintain the setpoint pressure; and determining the leakage by measuring the air flow. Fourth, and finally, the device under test is vented by closing the test valve; and opening a vent valve having a first port in fluid communication with the device under test and a second port open to a vent to the surrounding atmosphere allowing the device under test to vent to atmospheric pressure for a programmed period of time.

The step of opening a bleed valve may further comprise the step of opening a flow control valve positioned between and in fluid communication with the air relay and the bleed valve, and may even further comprise opening a flow control valve positioned between and in fluid communication with the air relay and the bleed valve to a desired flow rate. The bleed valve is normally open according to one presently preferred aspect of the invention.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

Figure 1:
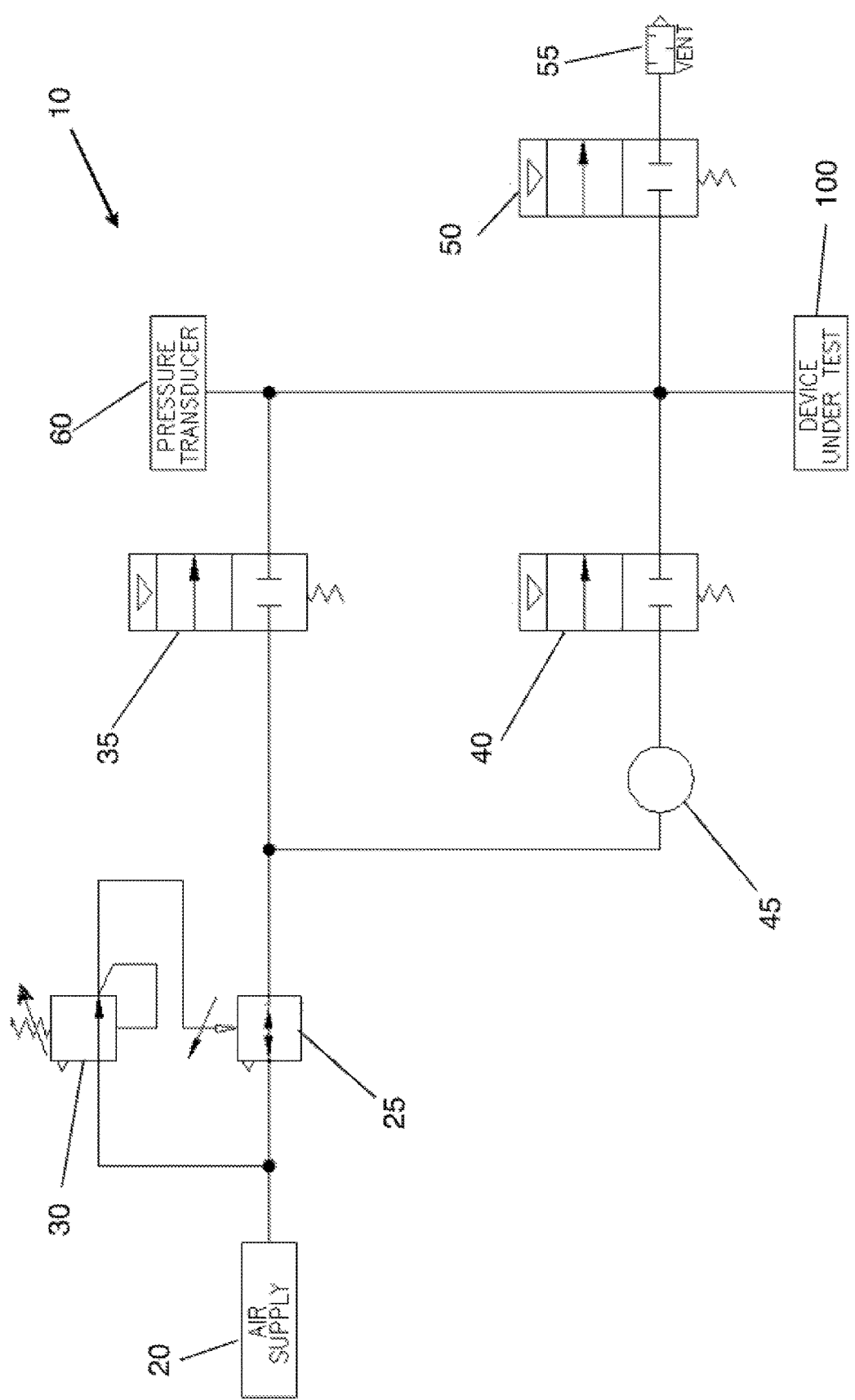
FIG. 1 is a schematic drawing of a testing device for performing pneumatic testing according to the prior art.
Figure 2:
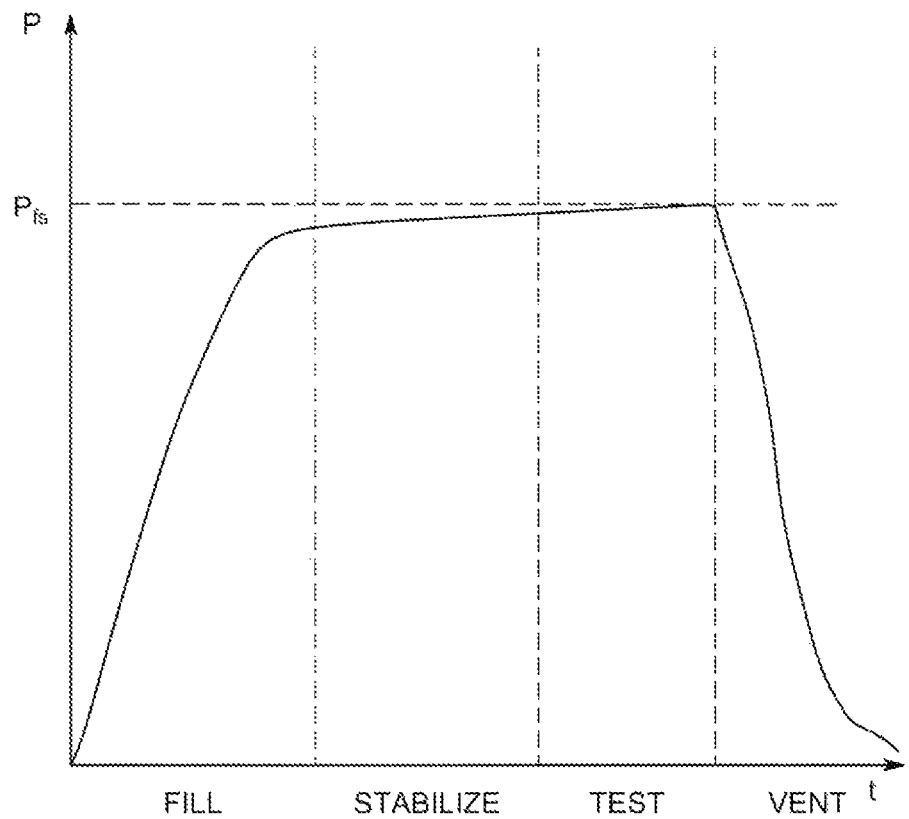
FIG. 2 illustrates a typical pressure profile created during filling, stabilization, testing and venting using the prior art device shown in FIG. 1.

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Figure 3:
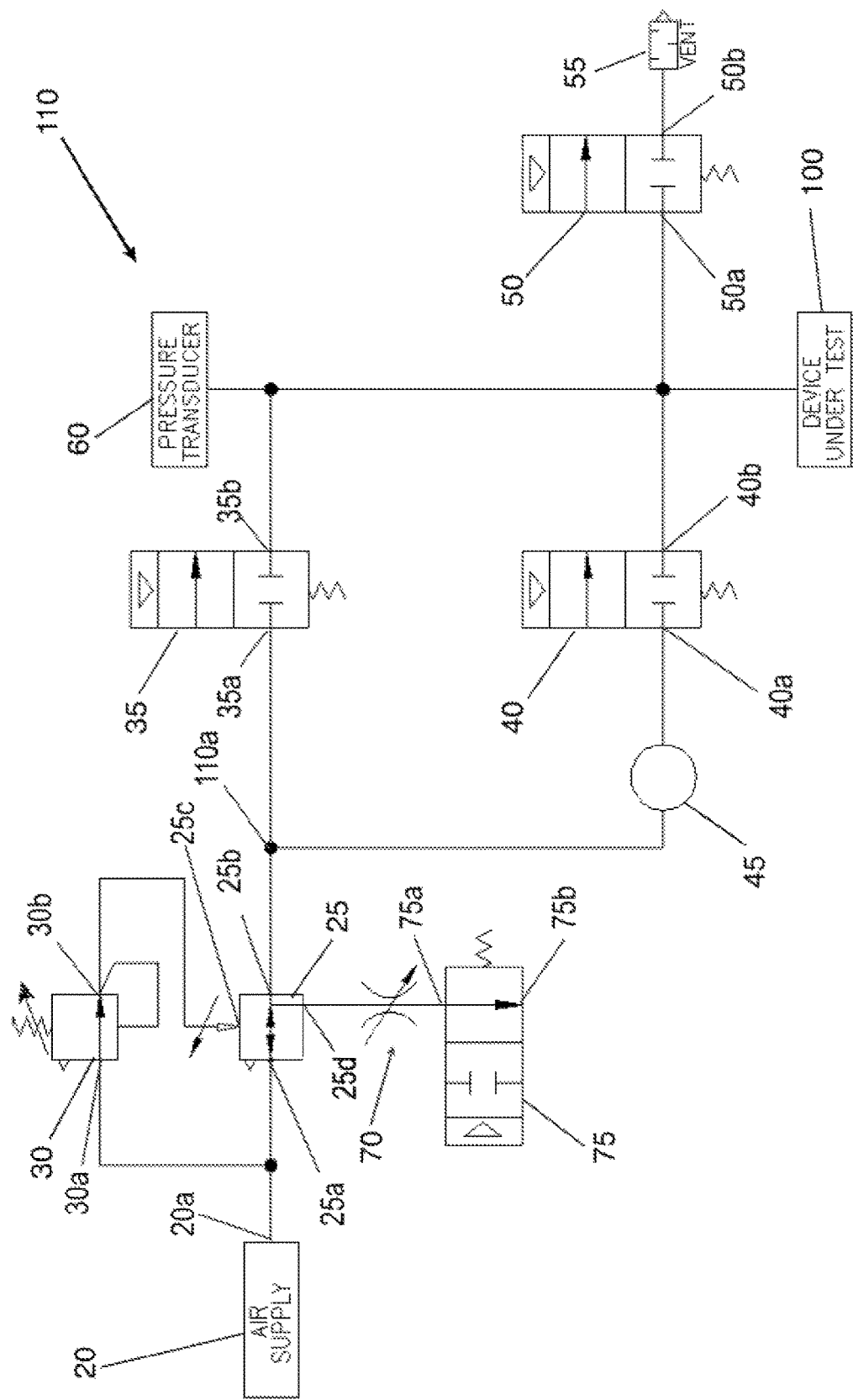
FIG. 3 is a schematic drawing of a bleeding air regulator control pneumatic circuit according to an embodiment of the present invention.

As best shown in FIG. 3, one presently preferred embodiment of the invention comprises a bleeding air regulator control pneumatic circuit 110. As with the prior art system described above, the circuit according to the present invention includes an air supply source 20 having an outlet port 20a, air relay 25 having a first port 25a in fluid communication with the outlet port 20a of the air supply source 20 and a second port 25b in fluid communication with an inlet 110a of the leakage detection system, pressure regulator 30 having an inlet port 30a in fluid communication with and connected at a point between the outlet port 20a of the air supply source 20 and the first port 25a of the air relay 25, and an outlet port 30b in fluid communication with and connected to a third port 25c of the air relay 25, fill valve 35 having a first port 35a in fluid communication with inlet 110a of the leakage detection system and a second port 35b in fluid communication with the device under test (DUT) 100, test valve 40 having a first port 40a in fluid communication with the inlet 110a of the leakage detection system and a second port 40b in fluid communication with the device under test (DUT) 100, mass flow sensor 45, vent valve 50 having a first port 50a in fluid communication with the device under test (DUT) 100 and a second port 50b open to accompanying vent 55, and pressure transducer 60 for application of air under pressure to a device under test (DUT) 100. In the present invention, the air relay 25 is a non-bleeding air relay (also known as a volume booster) to achieve maximum flow possible. The air relay 25 can deliver a very large quantity of air to the DUT 100.

According to an embodiment of the present invention, a port, such as the gauge port 25c, of the air relay 25 is connected to a flow control valve 70, which is connected to a bleed control valve 75 having a first port 75a in fluid communication with a fourth port 25d of the air relay 70 and a second bleed port 75b. The bleed rate of the air relay 25 can then be set to the desired rate by opening the flow control valve 70 to a desired flow rate for the applicable sensor (bleed rates are optimized for specific applications per the flow sensor being used).

The output of the air from the flow control valve 70 is directed to the normally open bleed control valve 75, so the bleeder flow control normally bleeds air. If the bleed control valve 75 valve is energized, the bleed valve 75 is closed and the flow of air is stopped. When the bleed control valve 75 is closed and the bleed air is stopped, the setpoint on the air relay 25 is raised slightly and in turn, the air pressure to the DUT 100 is raised as well.

Figure 4:
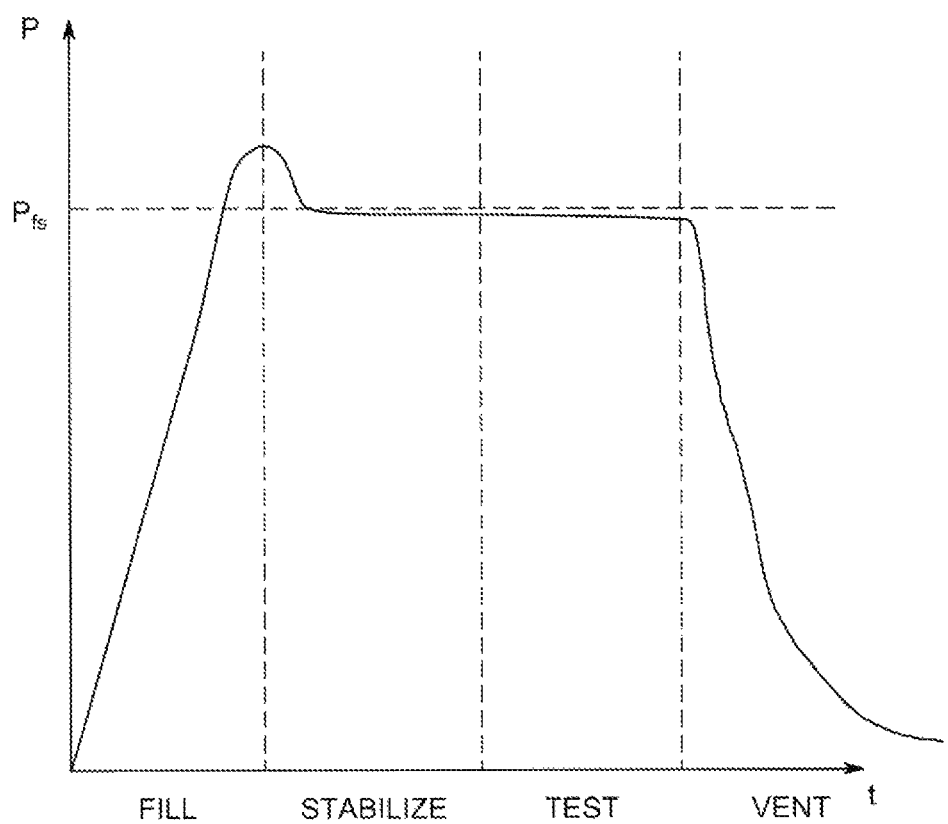
FIG. 4 illustrates a typical pressure profile created during filling, stabilization, testing and venting using the prior art device shown in FIG. 3.

As shown in FIG. 4, this function acts as a fast fill function or a slight over pressurization from the actual test setpoint setting. This allows the filling of air to the DUT to happen faster and allow the part to stretch slightly as the setpoint pressure is over shot. When the bleeder control valve 75 is then opened, the air bleed will begin to flow thus dropping the setpoint pressure slightly. The bleeding effect allows the setpoint pressure to the DUT 100 to quickly vent down to the desired setpoint pressure. This allows the DUT 100 to contract as the setpoint pressure drops. This allows for the DUT to quickly stabilize. Since the DUT 100 has been filled with air quicker and has stabilized quicker, the DUT 100 can then be measured for leakage at a faster cycle time. With the bleeder control circuit flow rate optimized, the flow sensor can achieve the fastest response time possible.

The testing method of the present invention involves the same basic steps as in the prior art (filling, stabilization, testing, venting) with some variations. In the fill step, the fill valve is opened and the bleeder control valve is closed, which allows the filling of the DUT 100 to a test pressure slightly above the final setpoint pressure for a programmed period of time. Next, during the stabilization step, the fill valve 35 remains opened (continues delivering air to the DUT), while the Bleed Control Valve 75 is closed (allows the flow control to flow which slightly lowers the test pressure delivered by air relay 25). During the stabilization step, the test valve 40 is also opened which allows an alternative flow path to the DUT 100 through the mass flow sensor 45.

During the test step, the fill valve 35 is closed and bleed control valve 75 remains opened while the test valve 40 remains open, allowing all test air to be delivered through the mass flow sensor 45 for a programmed period of time. The air flowing through the mass flow sensor 45 measures the amount of replacement air required to maintain the setpoint pressure to the DUT 100. The air flow measurement in turn determines the amount of leakage of the DUT 100.

Finally, during the vent step, the fill valve 35 is closed, test valve 40 is closed and bleeder control valve 75 remains open, and vent valve 50 is opened allowing the DUT 100 to vent to atmospheric pressure through vent 55 for a programmed period of time.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

I claim:

1. A bleeding air regulator control pneumatic circuit for supplying air to a leakage detection system for testing a device under test for leakage, said bleeding air regulator control pneumatic circuit comprising:
   a. an air supply source having an outlet port for supplying compressed air to the leakage detection system;
   b. an air relay having a first port in fluid communication with the outlet port of said air supply source and a second port in fluid communication with an inlet of the leakage detection system;
   c. a pressure regulator having an inlet port in fluid communication with and connected at a point between the outlet port of the air supply source and the first port of the air relay, and an outlet port in fluid communication with and connected to a third port of the air relay;
   d. a bleed valve having a first port in fluid communication with a fourth port of the air relay and a second bleed port; and
   e. means for controlling the fluid flow from the second bleed port of the bleed valve.

2. The bleeding air regulator control pneumatic circuit according to claim 1 wherein the means for controlling comprises a flow control valve positioned between and in fluid communication with the air relay and the bleed valve.

3. The bleeding air regulator control pneumatic circuit according to claim 1 wherein the air relay is a non-bleeding air relay.

4. The bleeding air regulator control pneumatic circuit according to claim 1 wherein the leakage detection system comprises:
   a. a fill valve having a first port in fluid communication with inlet of the leakage detection system and a second port in fluid communication with the device under test;
   b. a test valve having a first port in fluid communication with the inlet of the leakage detection system and a second port in fluid communication with the device under test;
   c. a mass flow sensor in fluid communication with and positioned between the test valve and the inlet of the leakage detection system;
   d. a vent valve having a first port in fluid communication with the device under test and a second port open to a vent to the surrounding atmosphere; and
   e. a pressure transducer in fluid communication with the second port of the fill valve and the device under test.

5. A leakage detection system for testing a device under test for leakage, said leakage detection system comprising:
   a. an air supply source having an outlet port for supplying compressed air;
   b. an air relay having a first port in fluid communication with the outlet port of said air supply, a second port, a third port and a fourth port;
   c. a pressure regulator having an inlet port in fluid communication with and connected at a point between the outlet port of the air supply source and the first port of the air relay and an outlet port in fluid communication with and connected to the third port of the air relay;
   d. a bleed control valve having a first port in fluid communication with a fourth port of the air relay and a second bleed port;
   e. means for controlling the fluid flow from the second bleed port of the bleed valve;
   f. a fill valve having a first port in fluid communication with the second port of the air relay, and a second port in fluid communication with the device under test;

g. a test valve having a first port in fluid communication with the second port of the air relay, and a second port in fluid communication with the device under test;

h. a mass flow sensor in fluid communication with and positioned between the test valve and the second port of the air relay;

i. a vent valve having a first port in fluid communication with the device under test and a second port open to a vent to the surrounding atmosphere; and j. a pressure transducer in fluid communication with the second port of the fill valve and the device under test.

6. The leakage detection system according to claim 5 wherein the means for controlling comprises a flow control valve positioned between and in fluid communication with the air relay and the bleed valve.

7. The leakage detection system according to claim 5 wherein the air relay is a non-bleeding air relay.

* * * * *